(12) United States Patent
Feng et al.

(10) Patent No.: US 7,334,934 B2
(45) Date of Patent: Feb. 26, 2008

(54) LIGHT GUIDE DEVICE AND A BACKLIGHT MODULE USING THE SAME

(75) Inventors: Di Feng, Beijing (CN); Ying-Bai Yan, Beijing (CN); Guo-Fan Jin, Beijing (CN); Shou-Shan Fan, Beijing (CN)

(73) Assignees: University of Tsinghua, Beijing (CN); Hon Hai Precision Industry Co., Ltd, Tu-Cheng, Tapei Hsien (TW)

( * ) Notice: Subject to any disclaimer, the term of this patent is extended or adjusted under 35 U.S.C. 154(b) by 0 days.

(21) Appl. No.: 11/265,427

(22) Filed: Nov. 2, 2005

(65) Prior Publication Data

US 2006/0104092 A1    May 18, 2006

(30) Foreign Application Priority Data

Nov. 12, 2004  (CN)  .................... 2004 1 0522648

(51) Int. Cl.
*F21V 7/04* (2006.01)

(52) U.S. Cl. .................... 362/626; 362/620; 349/65
(58) Field of Classification Search ................. 362/626
See application file for complete search history.

(56) References Cited

U.S. PATENT DOCUMENTS

| | | | |
|---|---|---|---|
| 5,128,842 A * | 7/1992 | Kenmochi ................... | 362/95 |
| 5,237,641 A | 8/1993 | Jacobson et al. | |
| 5,555,329 A | 9/1996 | Kuper et al. | |
| 5,709,447 A * | 1/1998 | Murakami et al. .......... | 362/621 |
| 5,772,305 A * | 6/1998 | Ishikawa et al. ............ | 362/621 |
| 5,779,337 A | 7/1998 | Saito et al. | |
| 5,926,033 A * | 7/1999 | Saigo et al. ................ | 362/600 |
| 5,999,685 A * | 12/1999 | Goto et al. ................. | 385/146 |
| 6,086,211 A * | 7/2000 | Ohkawa ..................... | 362/620 |
| 6,155,692 A * | 12/2000 | Ohkawa ..................... | 362/619 |
| 6,612,723 B2 * | 9/2003 | Futhey et al. ............... | 362/339 |
| 6,633,722 B1 * | 10/2003 | Kohara et al. .............. | 385/146 |
| 6,854,857 B2 * | 2/2005 | Hara et al. .................. | 362/613 |
| 6,940,570 B1 * | 9/2005 | Sumida et al. .............. | 349/61 |
| 6,955,453 B2 * | 10/2005 | Kunimochi et al. ........ | 362/333 |
| 7,101,070 B2 * | 9/2006 | Yu et al. ..................... | 362/558 |
| 7,134,778 B2 * | 11/2006 | Kazuhiro et al. ........... | 362/620 |

FOREIGN PATENT DOCUMENTS

| | | |
|---|---|---|
| CN | 2336378 Y | 9/1999 |
| CN | 2496052 Y | 6/2002 |

* cited by examiner

*Primary Examiner*—Hargobind S. Sawhney
(74) *Attorney, Agent, or Firm*—Morris Manning Martin LLP; Tim Tingkang Xia, Esq.

(57) ABSTRACT

A light guide device includes a main body and a plurality of parallel elongate first V-shaped microstructures. The main body has an incident surface; an emitting surface adjoining the incident surface; and a reflecting surface opposite to the emitting surface. The first V-shaped microstructures are provided on the reflecting surface. Each of the first V-shaped microstructures has a triangular cross-section having a first base angle nearest the incident surface, a second base angle furthest from the incident surface and a vertex angle. A pitch between adjacent microstructures is configured to be substantially constant. A size of each of the first V-shaped microstructures is defined by the equation is $y=9.2637\times10^{-6}x^2-0.0003x+0.0232$, wherein x is a distance from a given first V-shaped microstructures to the incident surface (in units of micrometers), and wherein y is a base width of the given first V-shaped microstructures (in units of micrometers).

17 Claims, 7 Drawing Sheets

LIGHT GUIDE DEVICE AND A BACKLIGHT MODULE USING THE SAME

FIELD OF THE INVENTION

The present invention relates to light guide devices and backlight modules and, particularly, to a light guide device and backlight module for use in, e.g., a liquid crystal display (LCD).

BACKGROUND

In a liquid crystal display device, a liquid crystal is a substance that does not itself radiate light. Instead, the liquid crystal relies on receiving light from a light source, thereby displaying images and data. In the case of a typical liquid crystal display device, a backlight module powered by electricity supplies the needed light.

FIG. 10 (Prior art) represents a first typical backlight module 100. The backlight module 100 includes a light source 10, a light guide device 12, and a plurality of complementary optical elements 11, 13, and 14. The light guide device 12 includes an incident surface 122 facing the light source 10, an emitting surface 124 located at a top thereof, and a reflecting surface 126 opposite to the emitting surface 124. The complementary optical elements include a reflective sheet 11, a diffusion sheet 13, and a brightness enhancement sheet 14. The reflective sheet 11 is positioned under the light guide device 12 and is configured for reflecting light back into the light guide device 12. The diffusion sheet 13 is located above the light guide device 12 and is configured for uniformly diffusing the emitted light, thereby avoiding the occurrence of light spots on the emitting surface 124 of the light guide device 12. The brightness enhancement sheet 14 is positioned above the diffusion sheet 13 and is configured for collimating the emitted light, thereby improving the brightness of light illumination. However, due to employing these complementary optical elements, the backlight module is unduly complicated and therefore is costly to manufacture.

The light guide device 12 converts the linear light source 10 into a surface light source. However, the light guide device 12 by its very nature cannot control the emergence direction of the light emitted therefrom. FIG. 10 shows a typical light path 15 associated with the backlight module 100. A light beam 101 emitted from the light source 10 enters into the light guide device 12 through the incident surface 122 thereof. The light beam 101 is reflected at the reflecting surface 126 and then exits from the emitting surface 124. However, the light beam 101 emitting from such a light guide device 12 is generally not perpendicular to the emitting surface 124. Therefore, the complementary optical elements, such as the diffusion sheet 13 and the brightness enhancement sheet 14, have to be employed so as to direct the light beam to exit from the light guide device 12 in a direction that is perpendicular to the emitting surface 124.

A second conventional backlight module 30 which can restrain the light emitting angle within a certain range is shown in FIG. 11. The backlight module 30 includes a light source 31, a light guide device 32, and an array of prisms 33. The light guide device 32 has an incident surface 322, an emitting surface 324, and a bottom surface 326. The incident surface 322 is disposed adjacent the light source 31, the emitting surface 324 adjoins the incident surface 322, and the bottom surface 326 is opposite to the emitting surface 324.

The array of prisms 33 is formed on the emitting surface 324. Each prism 33 has an index of refraction higher than that of the light guide device 32. Each prism 33 has first, second, third, and fourth sides 334, 335, 336, 337. The first side 334 is brought into optical contact with the light guide device 32 at emitting surface 324. The fourth side 337 is opposite to the first side 334. The second and third sides 335, 336 adjoin the first and fourth sides 334, 337, respectively. Either of the second and third edges 335, 336 and the first side 334 cooperatively form an acute angle.

Upon being totally internally reflected, the light is directed to exit from the light guide device 32 and enters into the prisms 33 through the first side 334 thereof. The light is then reflected by the third side 336 of the prisms 33 and exits the prisms 33 through the fourth side 337 thereof as a spatially directed light source. However, even though light is successfully redirected by such a module 30, it is difficult to mass produce the light guide device 32 by way of a conventional mold injection method.

A third conventional light guide device 40 is shown in FIG. 12. The light guide device 40 includes a body 401 configured for guiding light transmitted from a tubular light source 41. The body 401 has a plurality of projections 422 arrayed on an emitting surface 42. The projections 422 are parallel to each other and extend parallel to a longitudinal direction of the tubular light source 41. A height of each of the projections 422 progressively increases from a central region thereof to the two opposite ends thereof.

However, the light guide device 40 has its drawbacks. The projections 422 of the light guide device 40 are unduly complicated in structure and therefore are costly to manufacture. In particular, the light guide device 40 cannot be easily/readily mass produced by way of injection molding. Furthermore, the light guide device 40 cannot control the emitting light beams to exit perpendicularly from the emitting surface 42 of the light guide device 40. Therefore, the light guide device 40 generally still needs to employ additional optical correcting elements in order to redirect the light beams coming from the emitting surface 42 of the light guide device 40.

A fourth conventional backlight module 50 which can control the light emitting angle is shown in FIG. 13 and FIG. 14. The backlight module 50 includes a light source 51 and a wedge shaped light guide plate 52. The light guide plate 52 includes a multi-layer structure 53 formed on a bottom surface thereof. The multi-layer structure 53 includes a plurality of layers with an outmost layer having a plurality of projections 54. The layers each have different respective indices of refraction. However, as such, the multi-layer structure of the light guide plate 52 is unduly complicated in structure and therefore is costly to manufacture.

What is needed, therefore, is a large-sized light guide device which can control a plurality of emitting light beams to emit uniformly and substantially perpendicular to an emitting surface thereof and which can realize the function of a conventional backlight module without the aid of additional optical elements.

SUMMARY

The present display device provides a light guide device. A preferred embodiment of the light guide device includes a main body having an incident surface, an emitting surface, a reflecting surface, and a plurality of parallel elongate first V-shaped microstructures. The emitting surface adjoins the incident surface, while the reflecting surface is opposite to the emitting surface. The first V-shaped microstructures are provided on the reflecting surface. Each of the first V-shaped microstructures has a triangular cross-section having a first base angle nearest the incident surface, a second base angle furthest from the incident surface and a vertex angle. A pitch between adjacent such microstructures is configured to be substantially constant. Further, a size of each of the first V-shaped microstructures is defined by the equation: $y=9.2637 \times 10^{-6}x^2-0.0003x+0.0232$, wherein x is a distance from the first V-shaped microstructures to the incident surface, in units of micrometers, and y is a base width of the first V-shaped microstructures, in units of micrometers. Further, each first V-shaped microstructure is parallel to the incident surface (or at least essentially so).

The light guide device may further include a plurality of second V-shaped microstructures formed on the emitting surface thereof, the second V-shaped microstructures being oriented in a direction perpendicular to the incident surface thereof.

The light guide device may yet further include a plurality of third V-shaped microstructures formed on the incident surface thereof, the third V-shaped microstructures being oriented in a direction perpendicular to the reflecting surface thereof.

The light guide device may further include a highly reflective film formed on the reflecting surface, with the first V-shaped microstructures arranged and/or formed thereon.

The present display device also provides a backlight module using the same light guide device. A preferred embodiment of the backlight module includes a light source; and a light guide device including a main body. The main body of the light guide device has an incident surface, an emitting surface, a reflecting surface, and a plurality of parallel elongate first V-shaped microstructures. The incident surface is disposed adjacent the light source. The emitting surface adjoins the incident surface, and the reflecting surface is opposite to the emitting surface. The first V-shaped microstructures are formed on the reflecting surface. Each of the first V-shaped microstructures has a triangular cross-section having a first base angle nearest the incident surface, a second base angle furthest from the incident surface and a vertex angle associated therewith. A pitch between adjacent V-shaped microstructures is configured to be substantially constant, and a size of each of the first V-shaped microstructures is defined by the equation $y=9.2637 \times 10^{-6}x^2-0.0003x+0.0232$. In that equation, x is a distance from V-shaped microstructure to the incident surface in units of micrometers, while y is a base width of the V-shaped microstructures in units of micrometers.

Compared with conventional light guide devices, a preferred light guide device of the present display device has a plurality of first V-shaped microstructures on the reflecting surface thereof. The distribution densities and sizes of V-shaped microstructures enable the large-sized light guide devices to control the emitting light beams to emit uniformly and substantially perpendicular to an emitting surface thereof. The large-sized light guide devices do not need a plurality of additional optical elements and, thus, have a simple structure. In addition, the second V-shaped microstructures can be further provided in order to restrain light emitting angles and to promote collimating of the emitted light. The third V-shaped microstructures, if incorporated, can eliminate a plurality of dark areas formed adjacent to the incident surface. Furthermore, the high reflectivity film can improve utilization efficiency of light energy. Therefore, the light guide device can be advantageously applied in a large-sized backlight module of liquid crystal display devices.

Other advantages and novel features will become more apparent from the following detailed description of preferred embodiments when taken in conjunction with the accompanying drawings.

BRIEF DESCRIPTION OF THE DRAWINGS

Many aspects of the light guide device and related backlight module having the same can be better understood with reference to the following drawings. The components in the drawings are not necessarily to scale, the emphasis instead being placed upon clearly illustrating the principles of the present device. Moreover, in the drawings, like reference numerals designate corresponding parts throughout the several views.

DETAILED DESCRIPTION OF THE PREFERRED EMBODIMENTS

Reference will now be made to the drawings to describe preferred embodiments of the present backlight module, in detail.

Figure 1:
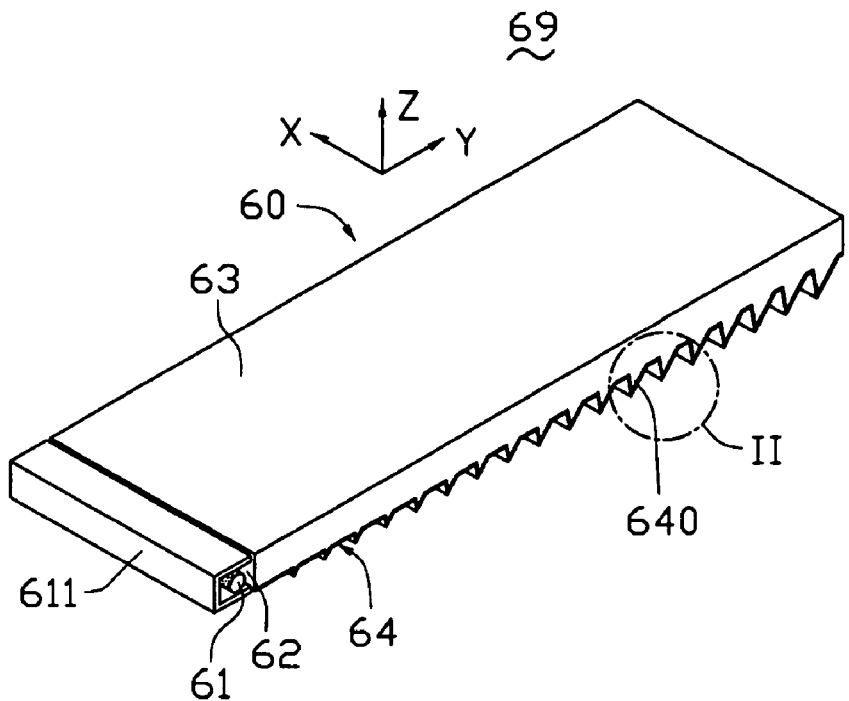
FIG. 1 is a schematic, perspective view of a backlight module according to a first preferred embodiment.

Referring to FIG. 1, a backlight module 69, in accordance with a first preferred embodiment, is shown. The backlight module 69 includes a light guide device 60, a cold cathode fluorescent lamp (CCFL) 61 and a reflector 611. The CCFL 61 is disposed adjacent to a side of the light guide device 60. The reflector 611 partly surrounds the CCFL 61. The CCFL 61 may alternatively be substituted with at least one light emitting diode (LED), a field emission device, or some other luminescent device.

The light guide device 60 is generally a flat sheet, which includes an incident surface 62, an emitting surface 63, a reflecting surface 64, and a plurality of V-shaped microstructures 640. The incident surface 62 faces the CCFL 61, while the emitting surface 63 is located at a top of the light guide device 60. The reflecting surface 64 is opposite to the emitting surface 63, and the plurality of V-shaped microstructures 640 are formed on and/or extend from the reflecting surface 64.

Figure 2:
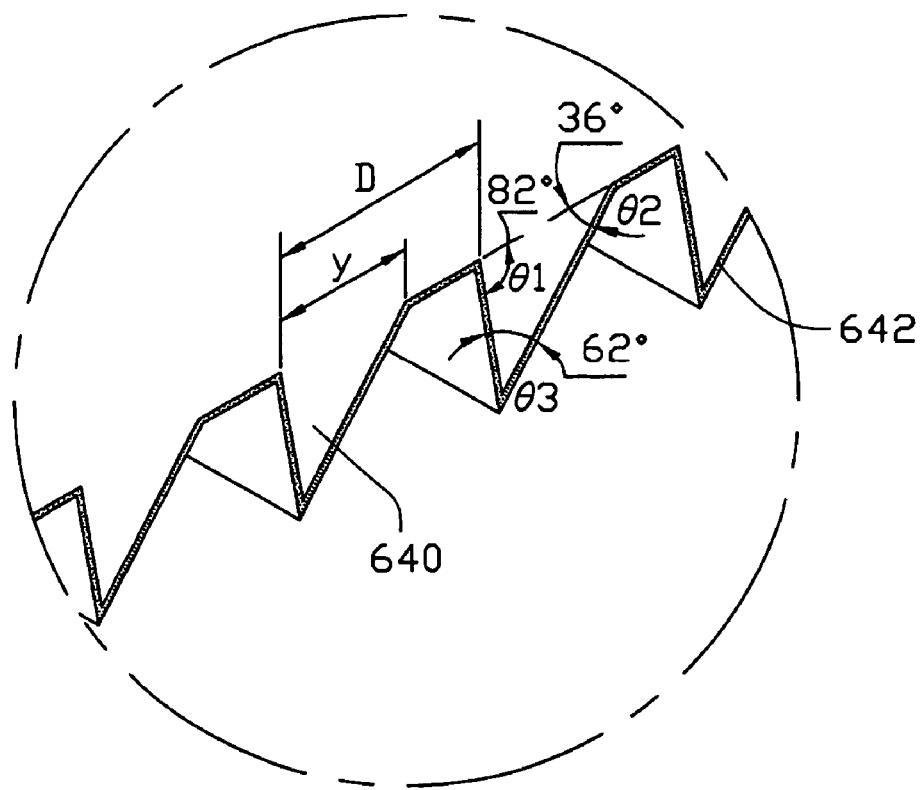
FIG. 2 is an enlarged view of a circled portion II of FIG. 1.

Referring also to FIG. 2, the V-shaped microstructures 640 each extend along the X-direction and are configured to be parallel (or at least essentially parallel) to each other. The V-shaped microstructures 640 are also aligned parallel to the incident surface 62. The V-shaped microstructures 640 have a similar shape but different sizes. Each of the V-shaped microstructures 640 is an elongate V-shaped projection having a uniform height along the length thereof. Each of the V-shaped microstructures 640 has a triangular cross-section. The triangular cross-section includes a first base angle θ1 nearest the incident surface 62, a second base angle θ2 furthest from the incident surface 62, and a vertex or apex angle θ3. The first base angle θ1 is configured to be about in the range from 70 to 90 degrees. The second base angle θ2 is configured to be in the approximate range from 15 to 50 degrees. The vertex angle θ3 is configured to be in the range of about from 40 to 95 degrees. In the first preferred embodiment, the first base angle θ1 is advantageously configured to be about 82 degrees, the second base angle θ2 is advantageously configured to be about 36 degrees, and the apex angle θ3 is advantageously configured to be about 62 degrees.

A pitch D between adjacent V-shaped microstructures 640 is configured to be constant. The pitch D is configured to be larger than a base width y of each of the cross-section of the V-shaped microstructures 640. The sizes (i.e., widths) of the individual V-shaped microstructures 640 satisfy the following equation: $y=9.2637\times10^{-6}x^2-0.0003x+0.0232$, wherein x is a distance between the V-shaped microstructure and the incident surface, in units of micrometers, and y is a base width of the V-shaped microstructure 640, in units of micrometers. Because the pitch D between adjacent V-shaped microstructures 640 is the same, respective base widths y of the V-shaped microstructures 640 progressively increase, with the distance x increasing. As such, respective sizes and densities of the V-shaped microstructures 640 progressively increase as the distance x increases. Accordingly, a distance between the apex of the first base angle θ1 of the triangular cross-section of the V-shaped microstructure 640 that is nearest the incident surface 62, and the incident surface 62 is greater than or equal to about 16.19 micrometers.

The base width y of the cross-section of each V-shaped microstructure 640 is configured to be about in the range from 10 micrometers to 300 micrometers. Advantageously, the width y is configured to be about 10 micrometers. Because the width y of the cross-section of each the V-shaped microstructure 640 is configured to be very small, the V-shaped microstructures 640 are therefore are not readily discernible to the naked eye. Therefore, there is no need to employ an additional diffusion sheet assembled to the backlight module 69. This configuration thus saves energy and reduces costs.

By the selective choice of the angles θ1, θ2, θ3 of the triangular cross-section of each of the V-shaped microstructures 640, the light beams can exit perpendicularly (or at least essentially so) from the emitting surface 63. If the emitting light intensity of part of the light guide device 60 were to be unduly high, the sizes and densities of the V-shaped microstructures 640 could be decreased accordingly so as to improve the uniformity of the emitting light intensity. On the contrary, if the emitting light intensity of part of the light guide device 60 should prove unduly low, the sizes and densities of the V-shaped microstructures 640 could instead be increased.

In order to improve the utilization efficiency of the light energy, a high reflectivity film 642 may be formed on the exterior of the first V-shaped microstructures 640 and on the intermediate reflective surface portions of the light guide device 60 (see FIG. 2). In order to further improve utilization efficiency of light energy, a high reflectivity film 642 may also be formed on other three sidewalls of the light guide device 60 other than the incident surface 62. The high reflectivity film 642 may be a metal film such as aluminum film, silver film and so on, or a dielectric film having high reflectivity characteristics.

Figure 3:
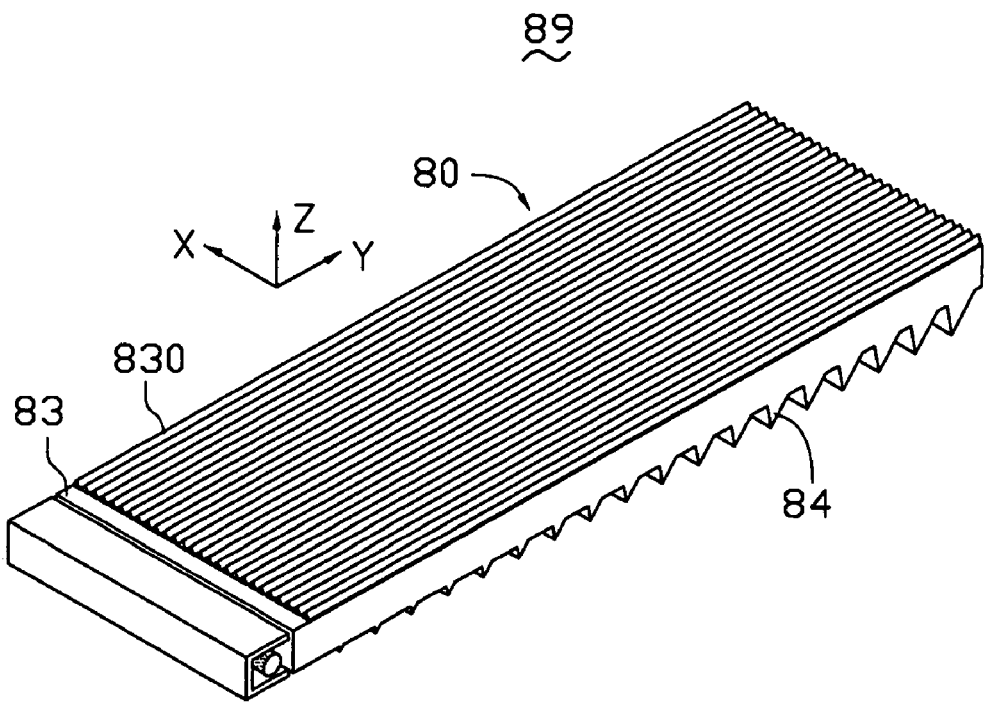
FIG. 3 is a schematic, perspective view of a backlight module according to a second preferred embodiment.

In order to restrain light emitting angles and to promote collimating of the emitting light, V-shaped microstructures may advantageously be formed on the emitting surface of the light guide device (as shown and described in relation to FIG. 3).

Referring to FIG. 3, a backlight module 89 in accordance with a second preferred embodiment is similar to that of the first embodiment, except that a light guide device 80 of the backlight module 89 further includes a plurality of second V-shaped microstructures 830 formed at an emitting surface 83 thereof. The second V-shaped microstructures 830 extend outwardly from the emitting surface 83. The second V-shaped microstructures 830 are arranged regularly and periodically along the X-axis direction (thereby extending essentially perpendicular to the first V-shaped microstructures 84). The second V-shaped microstructures 830 can be configured to be contiguous or discrete. The second V-shaped microstructures 830 advantageously have a same height and a same size. Each of the second V-shaped microstructures 830 has an isosceles triangular cross-section taken along the X-axis. The isosceles triangular cross-section of the second V-shaped microstructures 830 has a vertex angle. The vertex angle is configured to be approximately in the range from 50 to 150 degrees. A measurable height of the isosceles triangular cross-section is configured to be in the range from above about 0 to about 500 micrometers. In the illustrated embodiment, the vertex angle is configured to be 90 degrees. A pitch between adjacent second V-shaped microstructures 830 is configured to be about 0.2 micrometers.

In other exemplary embodiments, the backlight module may employ a plurality of LEDs as a light source. In such case, an intensity of incident light located adjacent the incident surface is generally non-uniform, and a plurality of dark areas may therefore be formed adjacent the incident surface. In order to solve this problem, a light guide device 90 (FIG. 4) in accordance with a third preferred embodiment of the present invention is provided.

Figure 4:
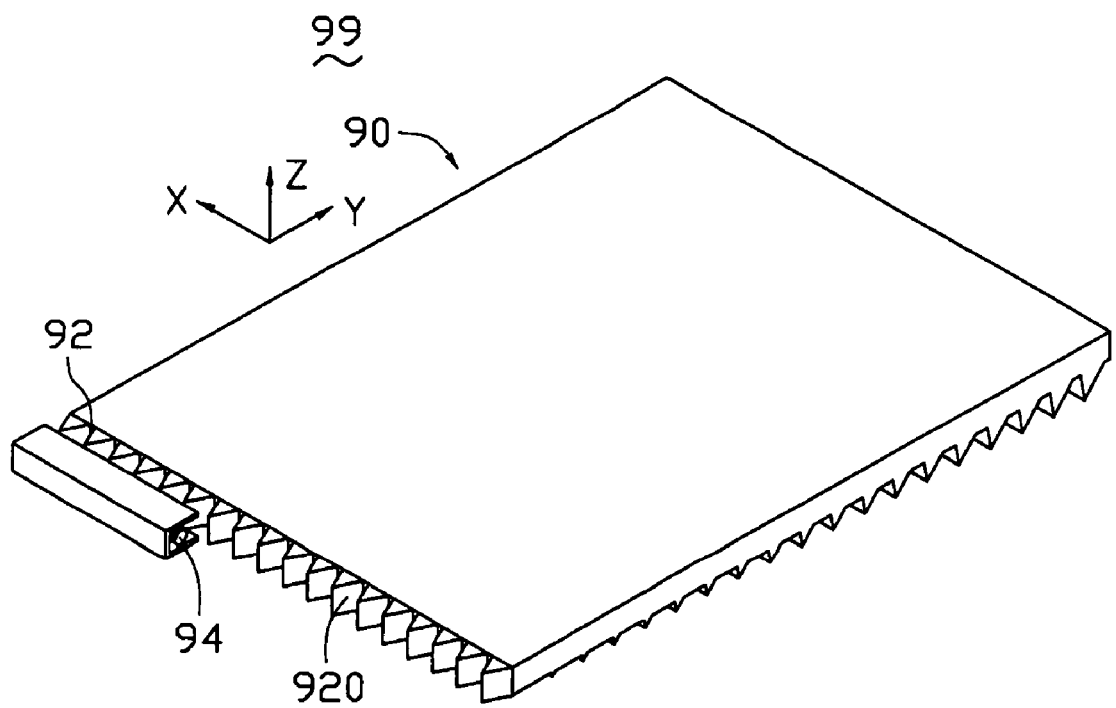
FIG. 4 is a schematic, perspective view of a backlight module according to a third preferred embodiment.

Referring to FIG. 4, the backlight module 99 in accordance with the third preferred embodiment is similar to that of the first embodiment, except that an LED light source 94, incorporating a plurality of LEDs, is used as a light source. In addition, the light guide device 90 further includes a plurality of third V-shaped microstructures 920 formed on an incident surface 92 thereof. The third V-shaped microstructures 920 extend outwardly from the incident surface 92. The third V-shaped microstructures 920 are arranged regularly and periodically in the X-axis direction. Each of the third V-shaped microstructures 920 advantageously has a same height and a same size. Each of the third V-shaped microstructures 920 has an isosceles triangular cross-section, when viewed via the Z-direction. The isosceles triangular cross-section of each of the third V-shaped microstructures 920 has a vertex angle. The vertex angle is configured to be in the range from 50 to 150 degrees. A height of the isosceles triangular cross-section is configured to be in the range from above about 0 to about 500 micrometers (a fractional amount of a micrometer is considered to be within the scope of this range). Advantageously, the vertex angle is configured to be about 120 degrees, while a pitch between adjacent third V-shaped microstructures 920 is configured to be about 1 micrometer.

Figure 5A:
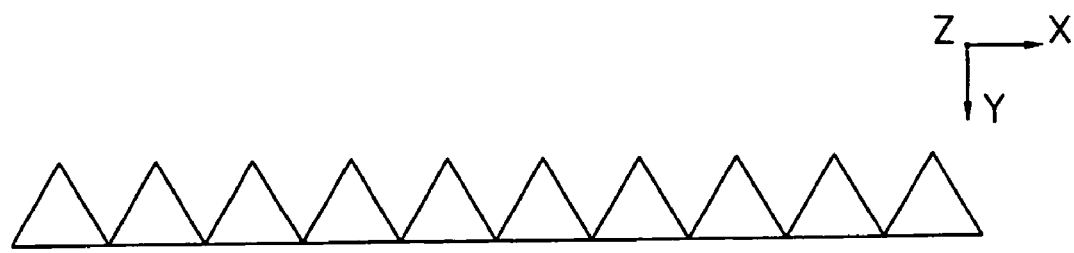
FIGS. 5A, 5B show two exemplary configurations of third V-shaped microstructures formed on an incident surface of a light guide device of the present backlight module.
Figure 5B:
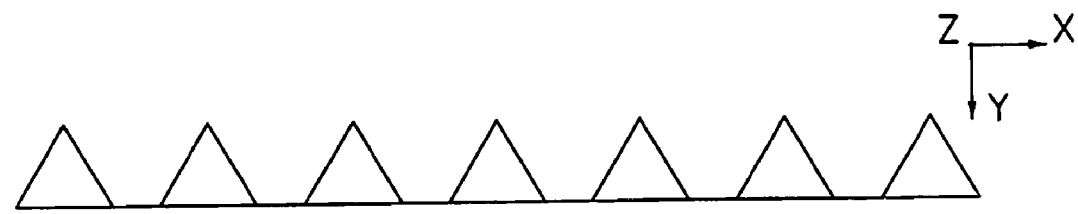

Referring to FIGS. 5A, 5B the third V-shaped microstructures of the light guide device 90 may be configured to either be contiguous (see FIG. 5A) or discrete (see FIG. 5B).

Figure 6:
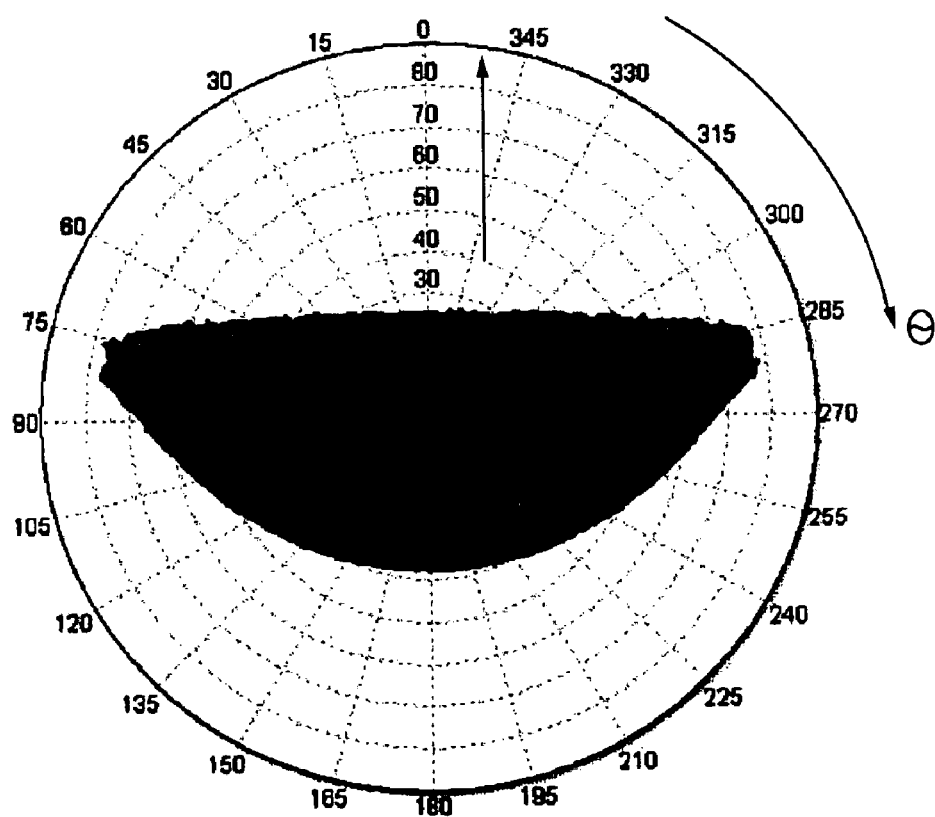
FIG. 6 is a graph showing a distribution of light emitting angles for the backlight module of FIG. 1.

FIG. 6 is a graph illustrating a distribution of light emitting angles for the light guide device 60 in accordance with the first preferred embodiment. Apparently, the emitting light is mainly located in a middle portion of the graph of FIG. 6. Accordingly, this graph indicates that most of the emitting light beams mainly exit from the light guide device 60 in a direction perpendicular to the emitting surface 63 thereof.

Figure 7:
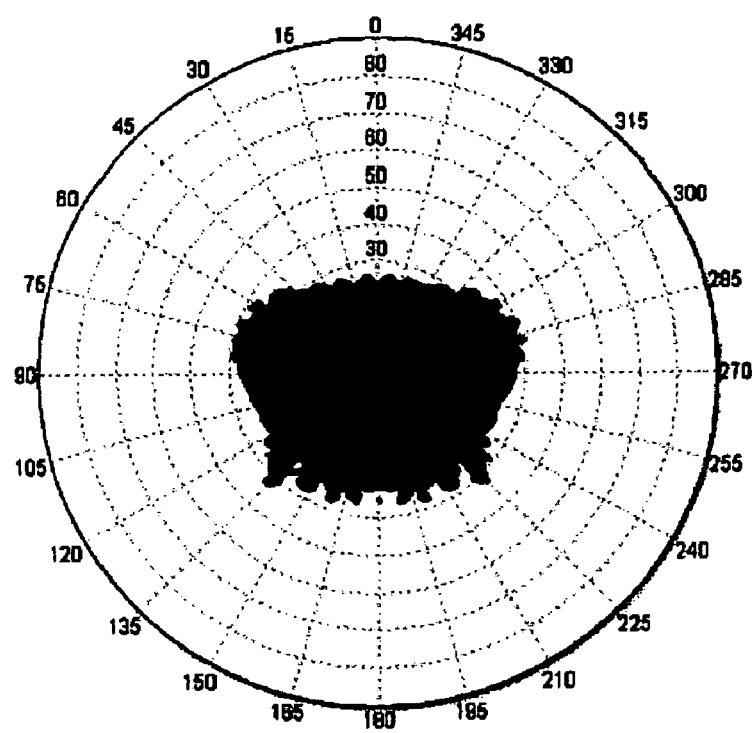
FIG. 7 is a graph showing a distribution of light emitting angles for the backlight module of FIG. 3.

FIG. 7 is a graph illustrating a distribution of light emitting angles for the light guide device 80 in accordance with the second preferred embodiment. The emitting light is substantially located in a center of the graph of FIG. 7. Compared to the light guide device 60 of the first embodiment, the light guide device 80 of the second embodiment can more effectively restrain the light emitting angles and thereby promote collimating of the emitting light beams.

Figure 8:
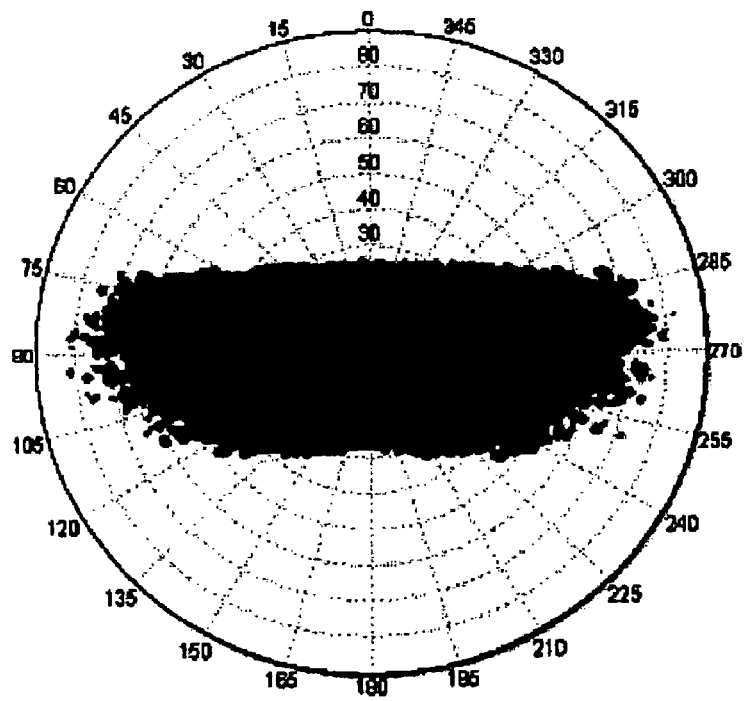
FIG. 8 is a graph showing a distribution of light emitting angles for the backlight module of FIG. 4.

FIG. 8 shows a graph illustrating a distribution of light emitting angles for the light guide device 90 in accordance with the third preferred embodiment of the present invention. The emitting light beams are mainly located in a middle portion of the graph of FIG. 8. The range of emitting angles for the emitting light of the light guide device 90 of FIG. 8 is larger than that of FIG. 6.

Figure 9:
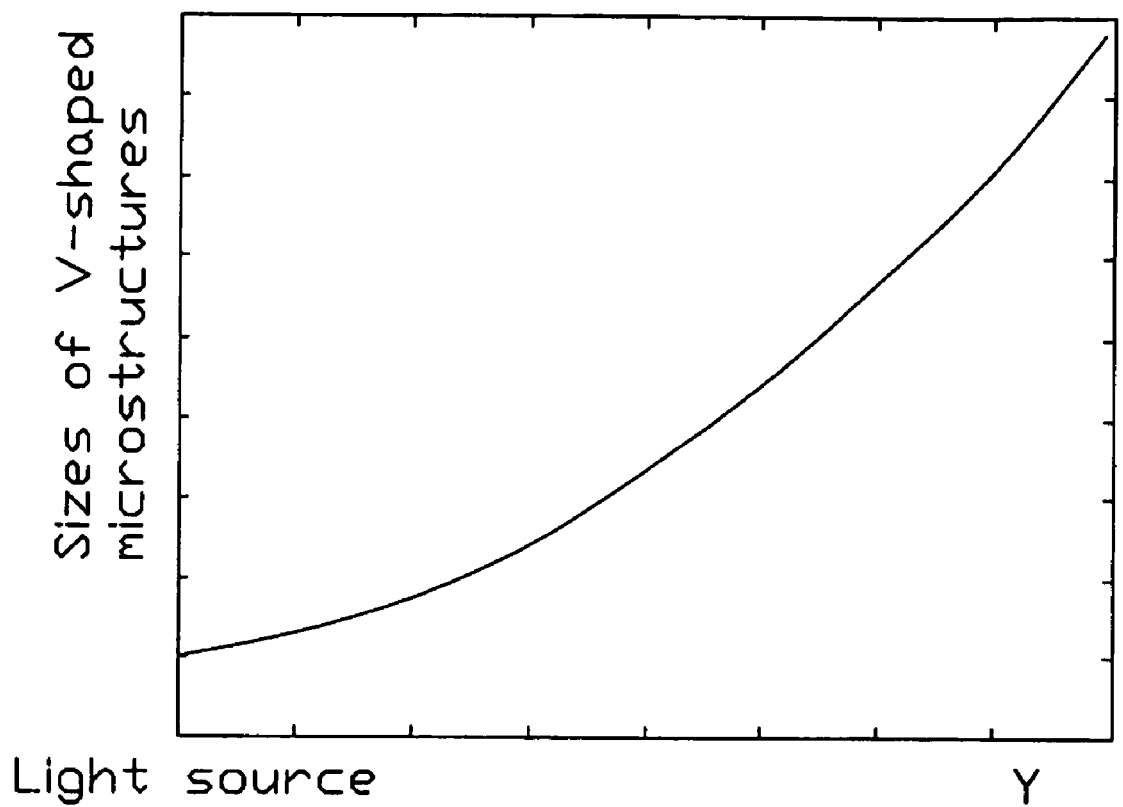
FIG. 9 is a graph showing a size distribution of V-shaped microstructures provided on a reflecting surface of a present light guide device, along the Y-axis direction.
Figure 10:
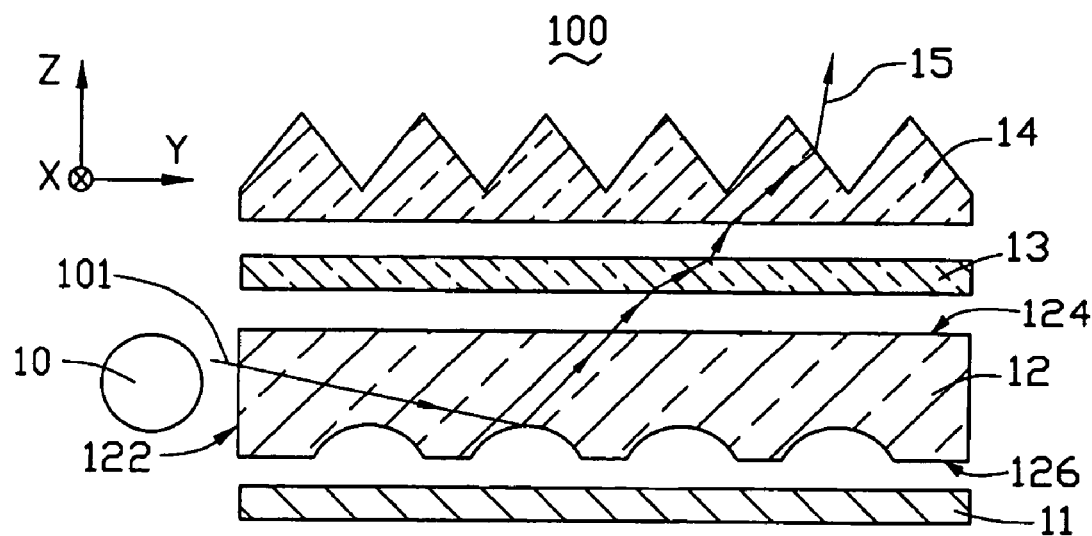
FIG. 10 is a schematic, exploded, cross-sectional view of a first conventional backlight module.
Figure 11:
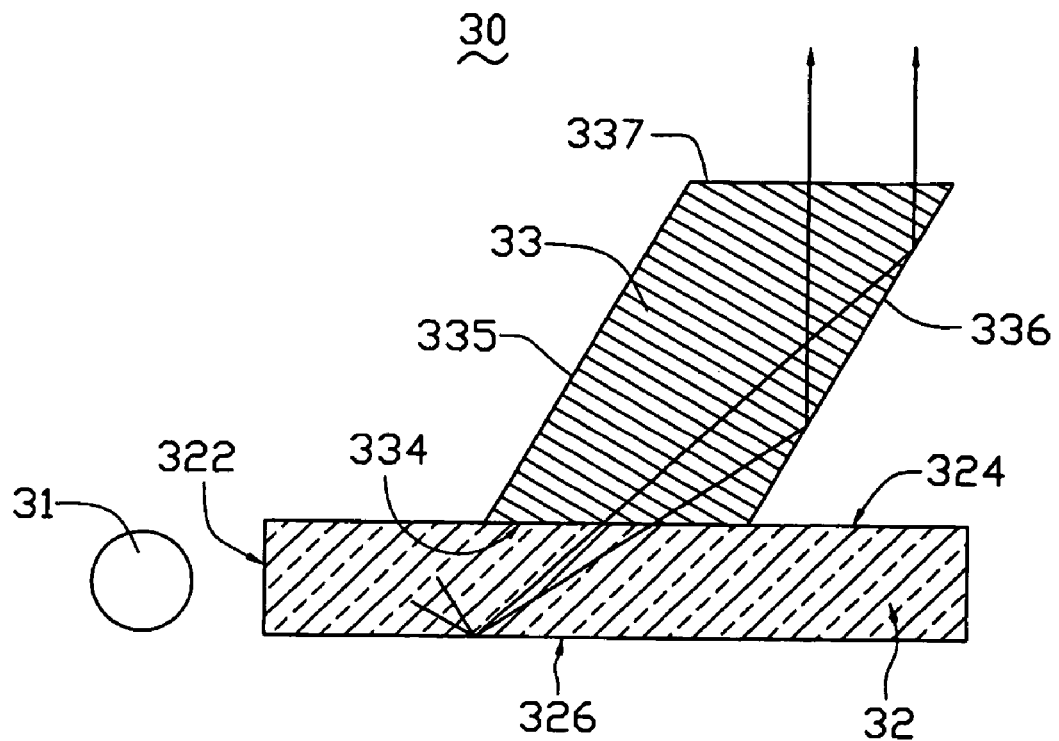
FIG. 11 is a schematic, cross-sectional view of a second conventional backlight module.
Figure 12:
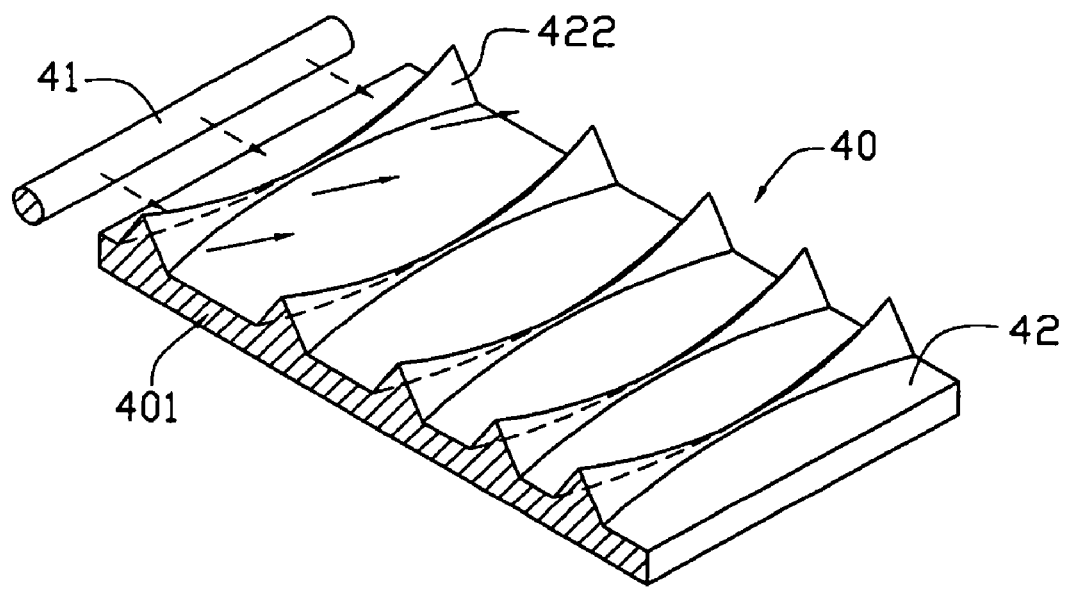
FIG. 12 is an isometric view of a third conventional backlight module.
Figure 13:
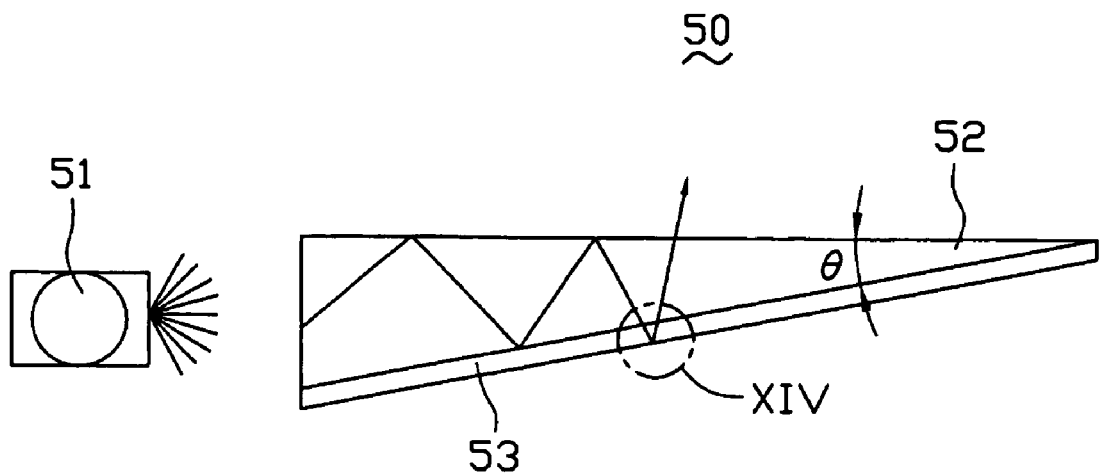
FIG. 13 is a schematic, cross-sectional view of a fourth conventional backlight module.
Figure 14:
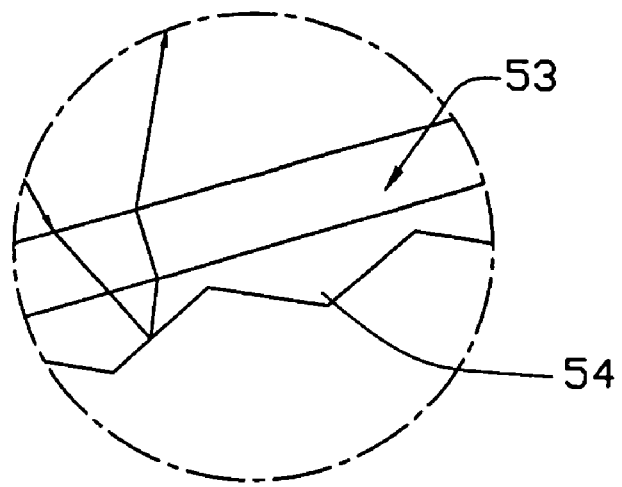
FIG. 14 is an enlarged view of a circled portion XIV of FIG. 13.

The V-shaped microstructures 640, 830, 920 of the present light guide device may be configured/chosen based on the composition material for such V-shaped microstructures and/or based on the size of the light guide device. For instance, referring to FIG. 9, the sizes of the V-shaped microstructures may increase along the Y-axis direction, and a distribution intensity of V-shaped microstructures along the Y-axis direction may be non-linear.

The overall shape of the light guide device may be configured to be flat or wedge-shaped. The light guide device may be comprised of a material selected from polymethyl methacrylate (PMMA), polycarbonate (PC), and other suitable transparent resin materials.

Finally, while the present invention has been described with reference to particular embodiments, the description is illustrative of the invention and is not to be construed as limiting the invention. Therefore, various modifications can be made to the embodiments by those skilled in the art without departing from the true spirit and scope of the invention as defined by the appended claims.

What is claimed is:

1. A light guide device, comprising:
a main body including:
an incident surface;
an emitting surface adjoining the incident surface;
a reflecting surface opposite to the emitting surface;
a plurality of parallel elongate first V-shaped microstructures provided on the reflecting surface; and
each first V-shaped microstructures having a triangular cross-section, the triangular cross-section having a first base angle nearest the incident surface, a second base angle furthest from the incident surface and a vertex angle, a distance between adjacent first V-shaped microstructures defining a first pitch, the first pitch being configured to be substantially constant between each particular pair of adjacent first V-shaped microstructures, a base width of the first V-shaped microstructures being defined by the equation $y=9.2637 \times 10^{-6}x^2 - 0.0003x + 0.0232$, wherein x is the distance between a given first V-shaped microstructure and the incident surface, in units of micrometers, and wherein y is the base width of the given first V-shaped microstructure, in units of micrometers.

2. The light guide device according to claim 1, wherein each of the first V-shaped microstructures has a same height.

3. The light guide device according to claim 1, wherein the first base angle is about in the range from 70 to 90 degrees, the second base angle is in the approximate range from 15 to 50 degrees, and the vertex angle is in the range of about from 40 to 95 degrees.

4. The light guide device according to claim 1, wherein the base width of each of the first V-shaped microstructures is about in the range from 10 to 300 micrometers.

5. The light guide device according to claim 1, further comprising a plurality of second V-shaped microstructures formed on the emitting surface thereof, the second V-shaped microstructures being oriented in a direction essentially perpendicular to the incident surface thereof.

6. The light guide device according to claim 5, wherein each second V-shaped microstructure has at least one of the following characteristics:
a given second V-shaped microstructure has a triangular cross-section having a vertex angle that is in the range from 50 to 150 degrees; and
a given second V-shaped microstructure has a height in the range from above about 0 to about 500 micrometers.

7. The light guide device according to claim 1, further comprising a plurality of third V-shaped microstructures formed on the incident surface thereof, the third V-shaped microstructures being oriented in a direction perpendicular to the reflecting surface thereof.

8. The light guide device according to claim 7, wherein each of the third V-shaped microstructures has at least one of the following characteristics:
a given third V-shaped microstructure has a triangular cross-section having a vertex angle that is in the range from 50 to 150 degrees; and
a given third V-shaped microstructure has a height in the range from above about 0 to about 500 micrometers.

9. The light guide device according to claim 1, further comprising a high reflectivity film formed on the exterior of the first V-shaped microstructures and on the intermediate reflective surface portions of the main body.

10. The light guide device according to claim 9, wherein the high reflectivity film is one of a metal film and a dielectric film.

11. The light guide device according to claim 10, wherein the high reflectivity film is a metal film, the metal film being one of an aluminum film and a silver film.

12. The light guide device according to claim 1, comprising three sidewalls with a high reflectivity film formed on the three sidewalls.

13. The light guide device according to claim 1, wherein the light guide device is one of a flat sheet and a wedge-shaped body.

14. The light guide device according to claim 1, wherein the light guide device is comprised of a material selected from a group consisting of polymethyl methacrylate, polycarbonate, and a combination thereof.

15. A backlight module comprising:
a light source; and
a light guide device comprising a main body comprising:
an incident surface disposed adjacent the light source;
an emitting surface adjoining the incident surface;
a reflecting surface opposite to the emitting surface;
a plurality of parallel elongate first V-shaped microstructures formed on the reflecting surface, each of the first V-shaped microstructures having a triangular cross-section each triangular cross-section including a first base angle nearest the incident surface, a second base angle furthest from the incident surface and a vertex angle, a distance between adjacent first V-shaped microstructures defining a pitch, the pitch being configured to be substantially constant between each particular pair of adjacent first V-shaped microstructures, a base width of the first V-shaped microstructures progressively increasing as a distance between the first V-shaped microstructures and the incident surface increasing; and wherein the base width is defined by the equation: $y=9.2637\times10^{-6}x^2-0.0003x+0.0232$, wherein x is a distance from a given first V-shaped microstructure to the incident surface, in units of micrometers, and wherein y is the base width of the given first V-shaped microstructure, in units micrometers.

16. The backlight module according to claim 15, further comprising a plurality of third V-shaped microstructures formed on the incident surface thereof, the third V-shaped microstructures being oriented in a direction perpendicular to the reflecting surface thereof.

17. The backlight module according to claim 15, further comprising a reflector partly surrounding the light source.

* * * * *

UNITED STATES PATENT AND TRADEMARK OFFICE
CERTIFICATE OF CORRECTION

PATENT NO. : 7,334,934 B2  Page 1 of 1
APPLICATION NO. : 11/265427
DATED : February 26, 2008
INVENTOR(S) : Di Feng It is certified that error appears in the above-identified patent and that said Letters Patent is hereby corrected as shown below:

Correction to Assignee under 37 CFR § 3.81(b)

On the Title page of the patent, please replace item (73) Assignee, as follows:

Assignee: ~~University of Tsinghua~~

Tsinghua University,

Beijing City, CHINA P.R.C.

Signed and Sealed this

Thirteenth Day of May, 2008

JON W. DUDAS
*Director of the United States Patent and Trademark Office*